United States Patent [19]

Schlidt

[11] Patent Number: 5,362,124
[45] Date of Patent: Nov. 8, 1994

[54] SEAT LOCKING AND ADJUSTMENT MECHANISM

[76] Inventor: Richard S. Schlidt, W215 N10135 Hickory Dr., Colgate, Wis. 53017

[21] Appl. No.: 976,370

[22] Filed: Nov. 13, 1992

[51] Int. Cl.$^5$ .............................................. B60N 2/02
[52] U.S. Cl. ..................... 297/95; 297/101; 297/378.11
[58] Field of Search ............... 297/94, 95, 97, 101, 297/340, 378.11

[56] References Cited

U.S. PATENT DOCUMENTS

| | | | |
|---|---|---|---|
| 531,122 | 12/1894 | Hoffman | 297/95 |
| 615,227 | 11/1898 | Pickles . | |
| 679,081 | 7/1901 | Koehler . | |
| 830,410 | 9/1906 | Budd | 297/97 |
| 2,660,222 | 11/1953 | Woodsworth . | |
| 3,265,435 | 8/1966 | Bilancia . | |
| 3,313,570 | 4/1967 | McVeigh . | |
| 3,479,082 | 11/1969 | Bilancia . | |
| 3,549,202 | 12/1970 | Boschen | 297/378.11 |
| 3,877,746 | 4/1975 | Christine | 297/95 |
| 3,897,101 | 7/1975 | Hess . | |
| 4,275,914 | 6/1981 | Holweg et al. . | |
| 4,322,052 | 3/1982 | Hodge | 297/95 |
| 4,407,542 | 10/1983 | Kehl et al. . | |
| 5,149,171 | 9/1992 | Gilevich et al. | 297/94 |

FOREIGN PATENT DOCUMENTS 1091569 12/1980 Canada ..................... 297/95

OTHER PUBLICATIONS

"Saf-T Walkover" brochure, published by Aircraft Industries Corp., Milwaukee, Wis. at least as early as 1990.

"Specification Change Request" published by ABB Traction, Inc. dated Jan. 30, 1990.

*Primary Examiner*—P. Austin Bradley
*Assistant Examiner*—James Miner
*Attorney, Agent, or Firm*—Andrus, Sceales, Starke & Sawall

[57] ABSTRACT

The seat adjustment and inertial locking mechanism is suitable for use with walk-over seats, as well as with other vehicular seats that have a movable seat back. The inertial locking mechanism includes a first rotatable cam member that engages a linearly-movable first locking member when the vehicle is traveling in a first direction and undergoes rapid deceleration. A braking surface on the first cam member engages a braking surface on the locking member to prevent further movement of the seat back. In a walk-over seat when the seat back has been moved to the second position and when the vehicle is traveling in a second direction, the second rotatable cam member engages a linearly-movable second locking member upon rapid deceleration of the vehicle. An adjustment means is also provided for tilting the bottom seat cushion when the seat back is moved from the first position to the second position. The adjustment means includes a movable frame connected to the bottom seat cushion, a first flipper that is pivotally connected to the movable frame and to a stationary frame member, and a rotatable dog member that engages a flange on the flipper to tilt the movable frame member when the seat back is being moved from the first position to the second position. When the seat back is moved from the second position to the first position, a second rotatable dog member engages a second flipper to tilt the movable frame and the bottom seat cushion to a second position.

18 Claims, 5 Drawing Sheets

SEAT LOCKING AND ADJUSTMENT MECHANISM

BACKGROUND OF THE INVENTION

This invention relates to adjustment and locking mechanism for vehicle seats. More particularly, this invention relates to such mechanisms for walk-over seats like the type used in railroad passenger cars.

Many types of vehicles have seats in which the seat back is movable from a first position to a second position. For example, two-door automobiles have seats whose seat backs are moved forward to allow a passenger to enter the rear of the passenger compartment to sit on the rear seat. Also, railroad cars have so-called "walk-over" seats. In a walk-over seat, the seat back faces a first direction when the railroad passenger car is traveling in a first direction. Instead of turning around the railroad car when the train travels in opposite, second direction, the seat backs of the railroad car seats are merely moved to a second position so that they face the second direction of travel. The train conductor typically walks down the aisle of the railroad passenger car and pushes the seat backs over to their second position.

One problem with movable seat backs is that the seat back may move forward upon rapid deceleration of the vehicle. Such rapid deceleration may occur, for example, during heavy braking or as a result of an impact between the vehicle and another object. The forward movement of the seat back under such conditions is typically caused by a force being applied to the back side of the seat back in the direction of travel.

Numerous latching and locking mechanisms are known to prevent the seat back from moving forward upon rapid deceleration of the vehicle. Some of the prior art latching mechanisms have a lever that locks the seat back into place. The use of such a lever, however, is undesirable in walk-over seats because the train conductor cannot simply walk down the aisle and move the seat backs. He must disengage each lever of each seat to move the seat back to the second position.

To overcome this disadvantage, several prior art locking mechanisms operate using the inertia of one or more members within the locking mechanism. For example, U.S. Pat. No. 3,897,101 to Hess discloses an inertial rack and pawl system in which two identical side-by-side systems control movement of the seat back. U.S. Pat. No. 2,660,222 to Woodsworth uses the inertial movement of a pendulum to prevent seat back movement during rapid deceleration.

These and other prior art systems are often very complex, and are expensive to manufacture since they contain parts that cannot be readily stamped out of metal.

SUMMARY OF THE INVENTION

A seat adjustment and locking mechanism is disclosed for a vehicle seat having a movable seat back. The mechanism is particularly suitable for use with walk-over seats, although it may be used for automobile, truck, bus, or other types of seats.

In a preferred embodiment, the invention includes a seat having an inertial locking mechanism on one side of the seat, a means for automatically tilting the bottom cushion of the seat when the seat back is moved from a first position to a second position, and a means for absorbing the load forces applied to the back side of the seat back and to the inertial locking mechanism during rapid vehicular deceleration.

The locking mechanism preferably includes first and second arms that are connected between the seat back and respective first and second torsion tubes. A first rotatable cam member is affixed to the first torsion tube and is rotatable therewith upon movement of the seat back. Similarly, a second rotatable cam member is affixed to the second torsion tube and is also rotatable with the movement of the seat back. The first rotatable cam member has a first wear surface thereon; likewise, the second rotatable cam member has a second wear surface thereon.

The first rotatable cam member is adapted to engage a first, wedge-shaped locking member that is slidable on a horizontal support rod when the vehicle rapidly decelerates. When the vehicle is traveling in the first direction and rapidly decelerates, the inertia of the first locking member causes the first locking member to overcome the spring force of a first spring that otherwise biases the first locking member to an inoperative position. A first braking surface on the first locking member engages the first wear surface of the first rotatable member to stop forward movement of the seat back when the vehicle is traveling in the first direction and when the vehicle rapidly decelerates. The forces imposed by the first rotatable member upon the first locking member are absorbed by the absorbing means, which includes a plurality of collapsible Belleville washers supported by a spring block.

When the seat back is moved to its second position so that it faces the second direction of travel, the second rotatable member engages a second locking member upon rapid deceleration of the vehicle. The second locking member is also preferably wedge-shaped and is supported by the same support rod as the first locking member. The inertia of the linearly-moving second locking member causes a second braking surface on the second locking member to engage a second wear surface on the second rotatable cam member to prevent further forward movement of the seat back upon rapid deceleration of the vehicle. A second bias spring disposed on the support rod applies a spring force to the second locking member to bias the second locking member to its inoperative position when the vehicle is not decelerating.

The present invention also includes a unique means for adjusting or tilting the bottom seat portion when the seat back is moved from its first position, in which it faces the first direction of travel, to its second position in which it faces the second direction of travel, or when the seat back is moved from facing the second direction to facing the first direction. This adjustment means includes a movable, tubular frame means for supporting the bottom seat portion or cushion, and at least one stationary member, the latter being either the main frame for the seat, a platform that supports the seat, or the floor of the vehicle.

The adjustment means also includes a first pivotable flipper member having one portion that is pivotally connected to the movable frame means and a second portion that is pivotally connected to the at least one stationary member. A first dog member, that is attached to the first torsion tube and that moves with the rotation of the first rotatable cam member, is designed to engage the first pivotable member to adjust and reposition the movable frame means and the bottom seat portion attached to the movable frame means when the seat back is moved from facing the first direction to facing the second direction.

The adjustment means also includes a similar means for tilting the bottom seat portion when the seat back is moved from facing the second direction of travel to facing the first direction of travel. This portion of the adjustment means includes a second pivotable member having one portion pivotally connected to the movable frame means and a second portion pivotally connected to the at least one stationary member. A second dog member affixed to the second torsion tube moves with the rotation of the second rotatable cam member and engages the second pivotable member to adjust the movable frame means and the bottom seat portion when the seat back is repositioned from facing the second direction to facing the first direction.

The absorbing means of the present invention absorbs load forces applied to the seat back to minimize permanent damaging deformation of the seat structure and of the locking mechanism. The absorbing means may also lessen any injury to a person which strikes the back of the seat back during rapid vehicular deceleration.

In a preferred embodiment, the absorbing means includes a plurality of cone-shaped, nested, collapsible Belleville washers supported by a spring block. During rapid vehicular deceleration, the forces applied to the seat back and the inertial forces of the seat back will cause the first locking member to engage the absorbing means, thereby collapsing the Belleville washers.

It is a feature and advantage of the present invention to provide an inexpensive inertial locking mechanism for vehicle seats.

It is another feature and advantage of the present invention to provide an inexpensive means for tilting the bottom seat cushion of a walk-over seat.

These and other features and advantages of the present invention will be apparent to those skilled in the art from the following detailed description of the preferred embodiments and the drawings, in which:

DETAILED DESCRIPTION OF THE PREFERRED EMBODIMENTS

Figures 1, 2:
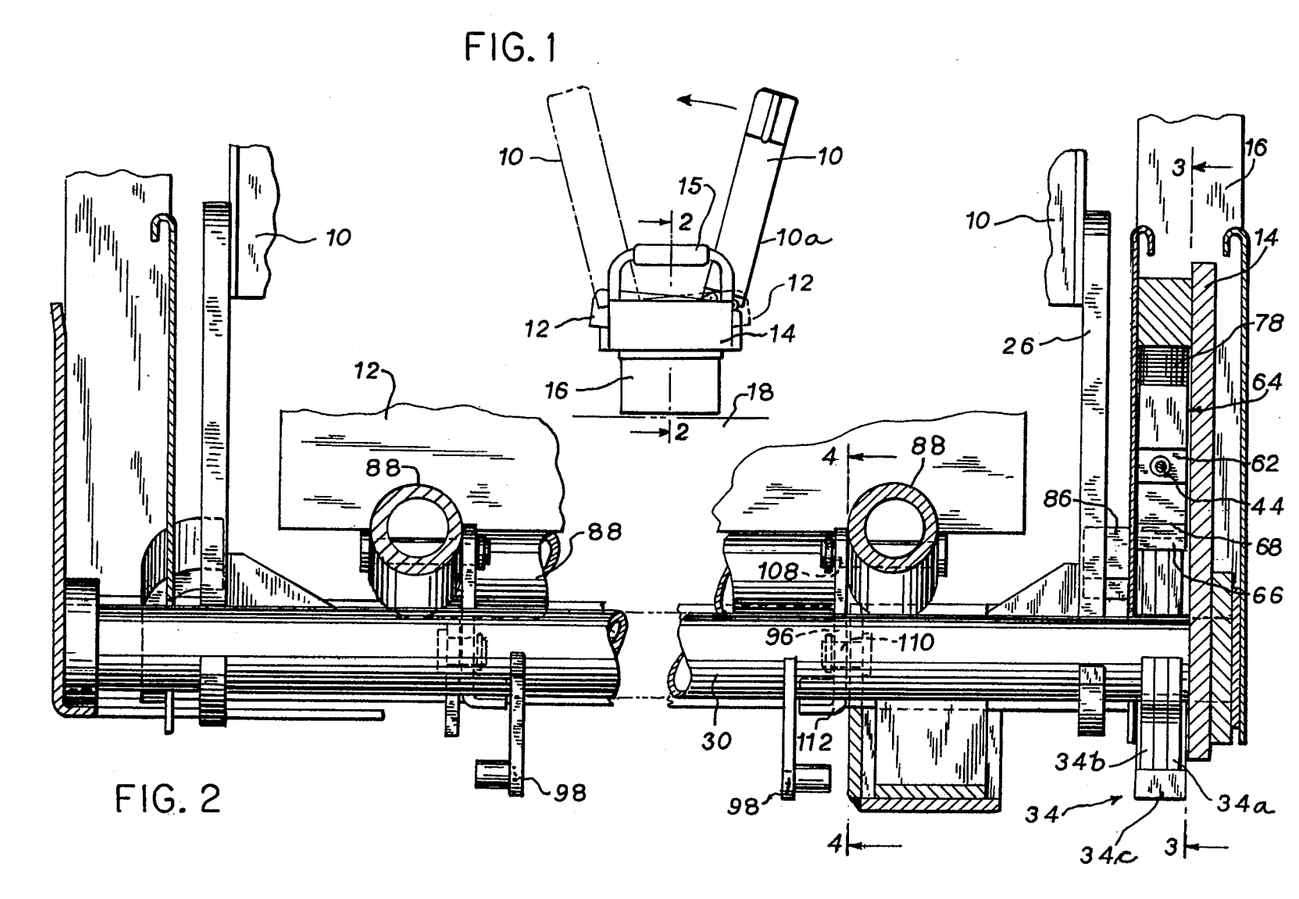
FIG. 1 is a side view of a walk-over seat being repositioned from a first position to a second position.
FIG. 2 is a cross sectional front view of the walk-over seat assembly, taken along line 2—2 of FIG. 1.

FIG. 1 is a side view of a walk-over seat assembly in which seat back 10 is being repositioned from a first position to a second position, the latter being shown in phantom. During such repositioning, bottom seat cushion 12 tilts from a position shown in the solid lines to the position shown in the dotted lines, using the adjustment means described below.

The inertial locking mechanism and the seat adjustment means according to the present invention are housed in a housing 14, to which is attached an armrest 15. The entire seat assembly is supported by a platform 16 which in turn is affixed to floor 18 of the vehicle. Although FIG. 1 depicts a walk-over seat assembly, it is understood that the inertial locking mechanism according to the present invention may be used with conventional bucket-type vehicle seats, and indeed with any vehicle seats in which the seat back is movable.

Figure 3:
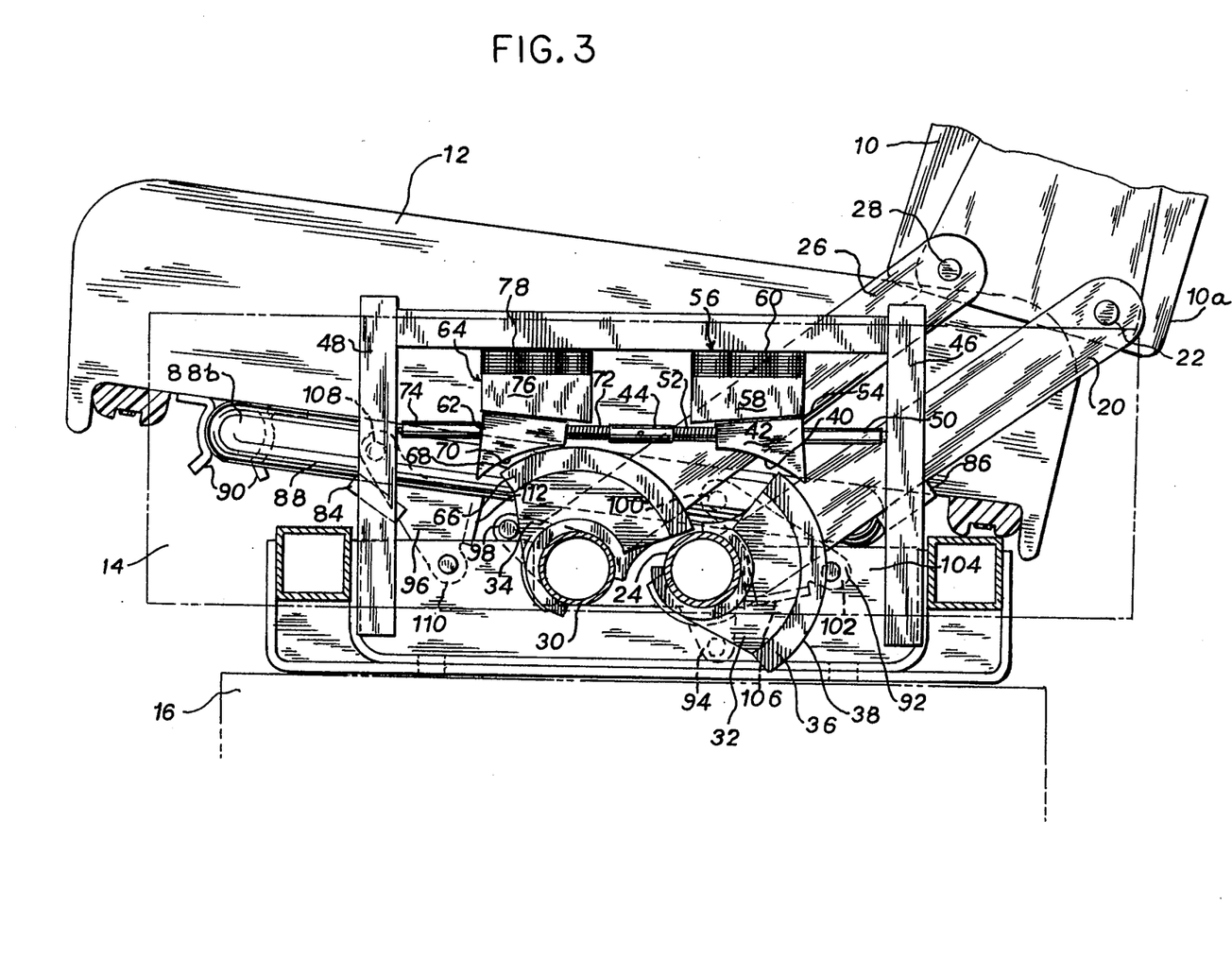
FIG. 3 is a cross sectional side view of the inertial locking mechanism according to the present invention, taken along line 3—3 of FIG. 2.

FIGS. 2 and 3 depict the inertial locking mechanism and the means for adjusting bottom cushion 12 according to the present invention. In FIGS. 2 and 3, a first arm 20 has one end pivotally connected to seat back 10 at pivot 22, and its opposite end welded or otherwise permanently affixed to an elongated torsion tube 24. A second arm 26 has one end pivotally connected to seat back 10 at pivot 28 and an opposite second end welded or otherwise permanent affixed to a second torsion tube 30. Torsion tubes 24 and 30 connect the opposite side of the seat to the side having the locking mechanism.

As best shown in FIG. 3, a first, rotatable cam member 32 is also permanently affixed to torsion tube 24 so that cam member 32 rotates with tube 24 and with the movement of first arm 20. Similarly, a second rotatable cam member 34 is permanently affixed to second torsion tube 30 and rotates with the movement of second arm 26. Arms 20 and 26, and thus cam members 32 and 34 and torsion tubes 24 and 30, all move in response to the movement of seat back 10.

First cam member 32 includes a first wear plate 36 having a first, substantially curved wear surface 38 thereon. Wear surface 38 is adapted to engage a corresponding, curved braking surface 40 on a first locking member 42. Locking member 42 is slidably supported by a support rod 44 having one end affixed to a stationary frame member 46 and an opposite end affixed to a stationary support member 48. Movement of locking member 42 is restricted by a spacer 50 and by a compression spring 52 that biases locking member 42 to an inoperative position.

Locking member 42 has an opposite surface 54 that engages load absorbing means 56 when first cam member 32 imposes a load on locking member 42. Absorbing means 56 preferably includes a spring block 58 and a plurality of Belleville washers 60, as more clearly shown in FIGS. 10 and 11.

Upon the rapid deceleration of the vehicle, the inertia of locking member 42 will cause locking member 42 to move in a linear manner to overcome the spring force of spring 52. At the same time, the inertia of seat back 10 and any load applied to back side 10a of seat back 10 will cause first arm 20 to begin to rotate torsion tube 24 in a counterclockwise direction, thereby also rotating first cam member 32. Wear surface 38 will then engage braking surface 40, causing surface 54 of locking member 42 to engage load absorbing means 56, thereby compressing Belleville washers 60.

The locking mechanism according to the present invention also has a means for locking seat back 10 when seat back 10 is facing in the second direction of travel—shown in phantom in FIG. 1—and when the vehicle is rapidly decelerating. These locking components include second cam member 34, second locking member 62, and a second load absorbing means 64.

Second cam member 34 includes a wear plate 66 having a second wear surface 68. Second wear surface 68 is adapted to engage a second braking surface 70 of a second locking member 62 when seat back 10 is in the second position—shown in phantom in FIG. 1—and when the vehicle is rapidly decelerating. Under those conditions, the inertia of second locking member 62 causes locking member 62 to move in the direction of vehicle travel, thereby overcoming the spring force of second spring 72. Spring 72 biases second locking member 62 to an inoperative position when the vehicle is not rapidly decelerating. Movement of second locking member 62 in the opposite direction is restricted by a spacer 74.

When second cam member 34 rotates in a clockwise direction during rapid deceleration of the vehicle, second wear surface 68 will engage second braking surface 70, thereby causing second cam member 34 to lock with second locking member 62. This locking action will stop the movement of lever arms 26 and 20, and thus will prevent seat back 10 from moving any further.

The load forces generated by second cam member 34 and second locking member 62 will be absorbed by second absorbing means 64. Second absorbing means 64 includes a second spring block 76 and a plurality of Belleville washers 78. Although support rod 44 will be deflected during the engagement of the locking mechanism, support rod 44 is designed so that it will readily return to its normal position.

A key feature of the present invention is that most of the component parts of the locking mechanism and of the bottom cushion adjusting means may be made from stamped metal. This design avoids the use of more costly manufacturing techniques. However, cam members 32 and 34 are expensive to manufacture if stamped out of a single piece of metal. Instead, each of these cam members consist of three parallel plates, which are welded to an overlying wear plate. FIG. 2 depicts the components of cam member 34. In FIG. 2, cam member 34 includes a first outer plate 34a, a second outer plate 34b, and a central plate 34c. Welded to plates 34a, 34b, and 34c is a single wear plate 66. The cam members and their respective wear plates must be relatively wide to bear the large forces imposed by them during the locking of the rear plate with their respective locking members during vehicular deceleration.

Figures 9, 10, 11:
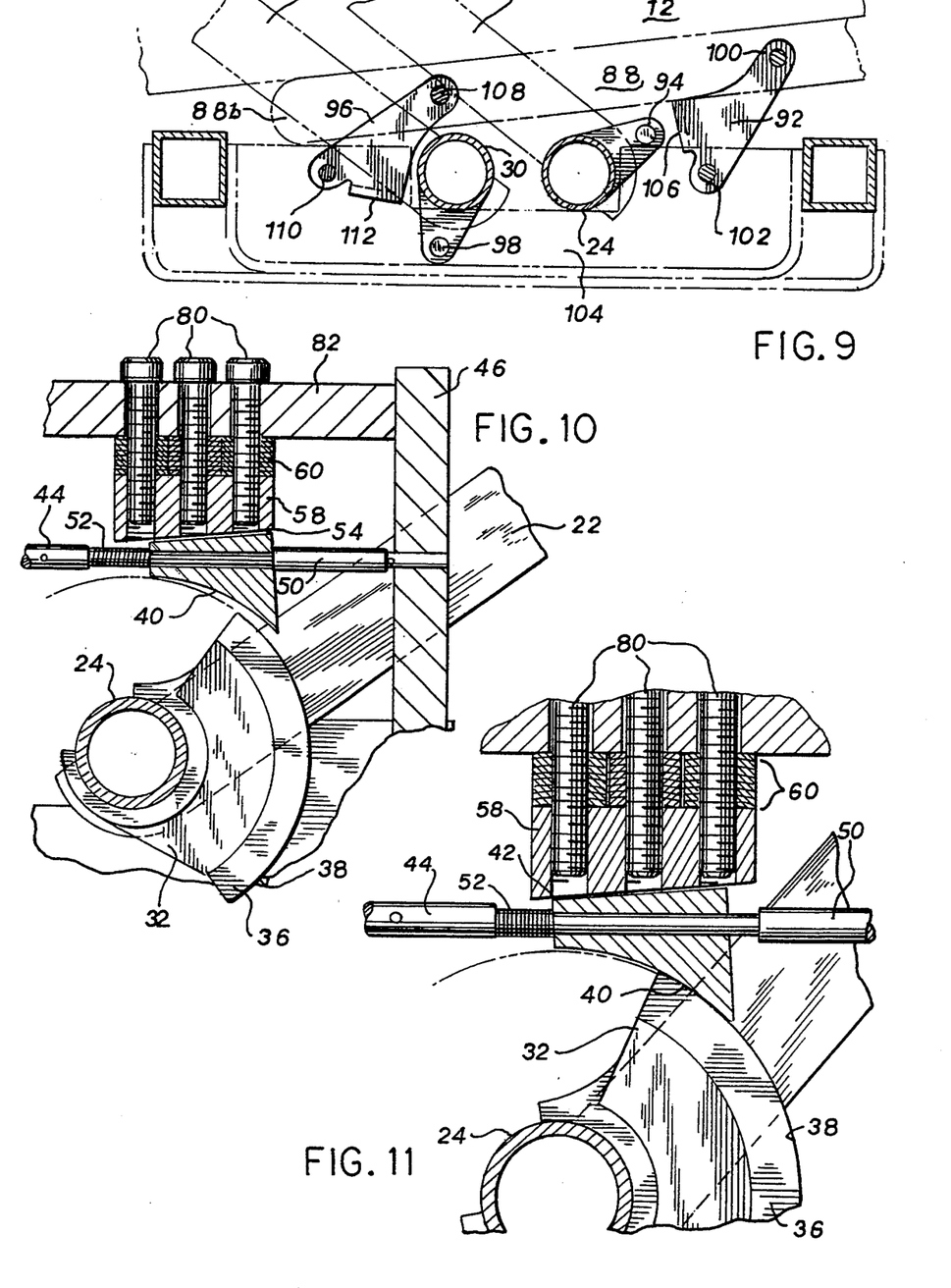
FIG. 9 is a side view of the bottom cushion adjustment means in its final position when the seat back is facing the second direction of travel.
FIG. 10 is an exploded side view of the inertial locking mechanism in its disengaged position.
FIG. 11 is an exploded side view of the inertial locking mechanism in its engaged or locked position.

FIGS. 10 and 11 more particularly depict the operation of the locking mechanism when seat back 10 is in the first position depicted in FIG. 1. As shown in FIG. 10, first cam member 32 begins to rotate in a counterclockwise direction until it engages first locking member 42, as depicted in FIG. 11. The resulting load forces are absorbed by Belleville washers 60 when surface 54 of locking member 42 presses spring block 58 in an upward direction to compress the Belleville washers. Spring block 58 is held in place by a plurality of fasteners 80 attached to a stationary frame member 82.

Figure 5:
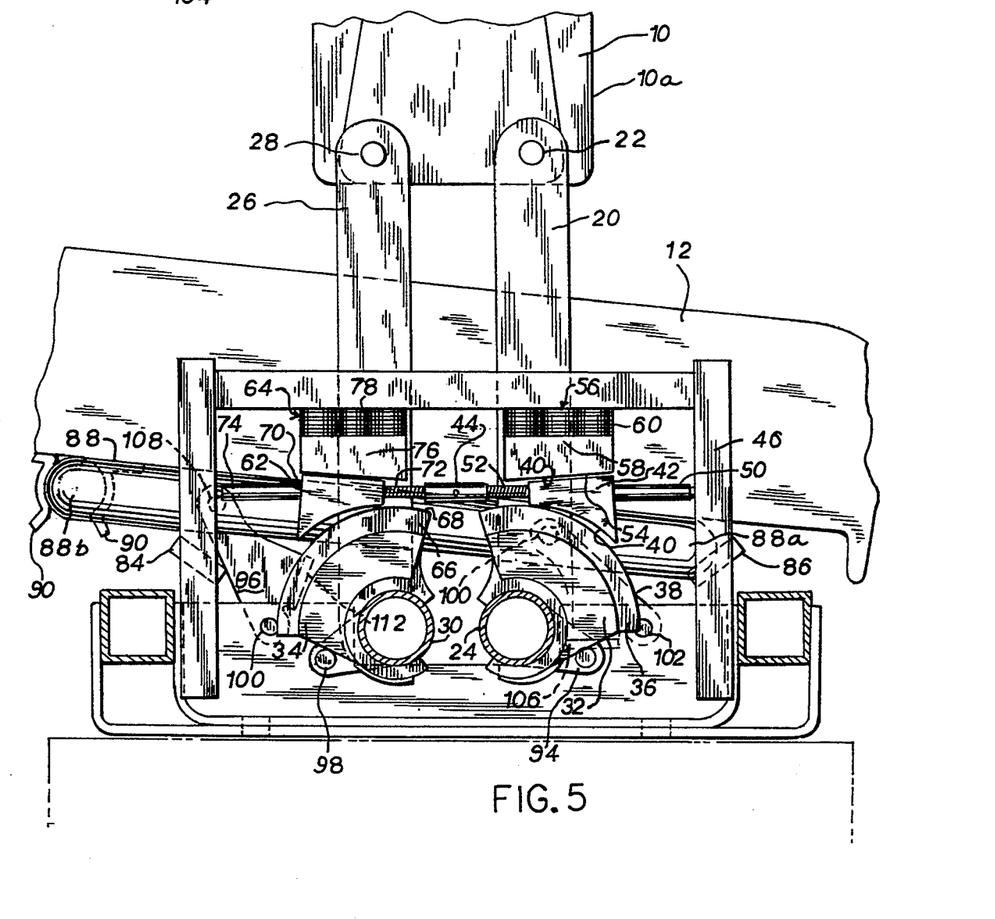
FIG. 5 is a side view of the inertial locking mechanism with the seat back in an intermediate position.

FIG. 5 depicts the position of the locking mechanism components when the vehicle is not decelerating, but when seat back 10 is positioned intermediate between its first position and its second position (FIG. 1). Since the vehicle is not decelerating, compression springs 52 and 72 keep their respective locking members 42 and 62 in their inoperative positions so that they do not engage their respective first cam member 32 and second cam member 34 while the cam members are rotating with the movement of their respective lever arms 20 and 26.

Figure 8:
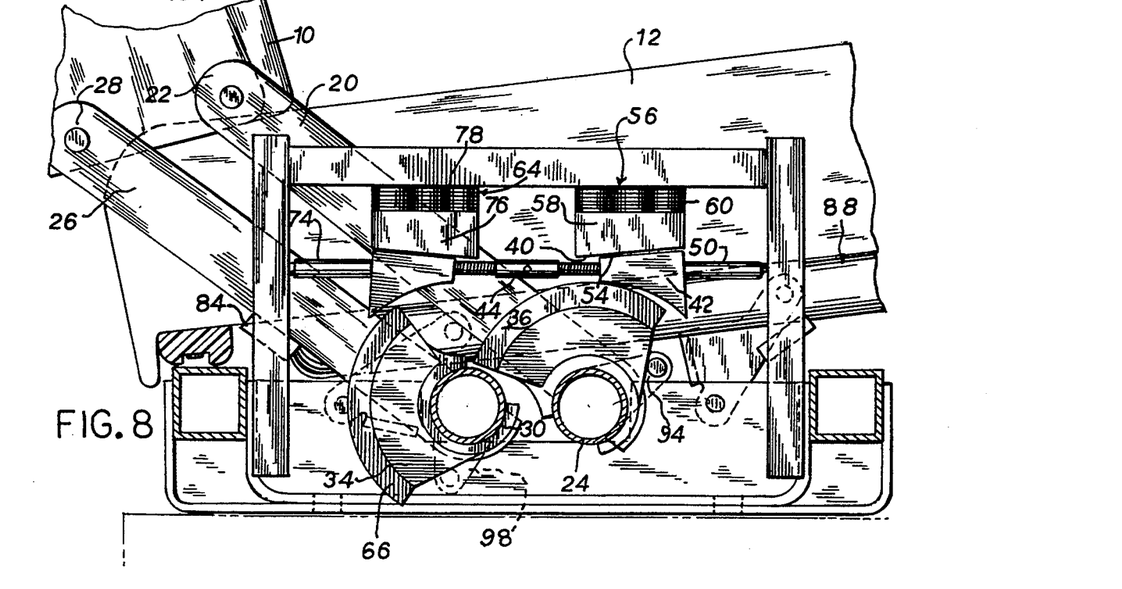
FIG. 8 is a side view of the seat assembly in its final position after the seat back has been repositioned to face the second direction of travel.

FIG. 8 depicts the position of the locking mechanism components after seat back 10 has been repositioned to its second position to face the opposite direction of travel. In this position, second arm 26 rests on a positive stop 84. In the first position depicted in FIG. 3, first arm 20 rests on a positive stop 86.

The adjustment means for adjusting or tilting bottom cushion 12 is depicted in FIGS. 2 through 5 and 9. Referring to these Figures, bottom cushion 12 is supported by a substantially rectangular, tubular frame 88 that is connected to cushion 12 by a plurality of pairs of clips 90. Since bottom cushion 12 is affixed to frame 88, cushion 12 tilts with the tilting of movable frame 88.

Movable frame 88 is tilted by means of a first pivotable member 92, a first dog member 94, a second pivotable member 96, and a second dog member 98. First pivotable member 92 has a first portion 100 pivotally connected to frame 88, and an opposite second portion 102 pivotally connected to a stationary structural frame member 104. First pivotal member 92 has a flange 106 designed to engage first dog member 94.

First dog member 94 is welded to first torsion tube 24 and is rotatable therewith. Rotation of dog member 94 in the counterclockwise direction causes dog member 94 to engage flange 106, thereby tilting frame 88 and cushion 12 when seat back 10 is being moved from the first position to the second position, as depicted in FIG. 1.

The bottom cushion adjusting means also includes a means for tilting frame 88 and bottom cushion 12 when seat back 10 is being moved from the second position to the first position. This tilting is accomplished by means of second pivotable member 96 and second dog member 98. Second pivotable member 96 has a first portion 108 pivotably connected to movable frame 88, and a second portion 110 that is pivotally connected to structural frame member 104. Second pivotable member 96 also includes a flange 112 that engages dog member 98 when seat back 10 is being moved from its second position to its first position.

The operation of the bottom cushion adjustment means is best understood by reference to FIGS. 4, 6, 7, and 9.

Figure 4:
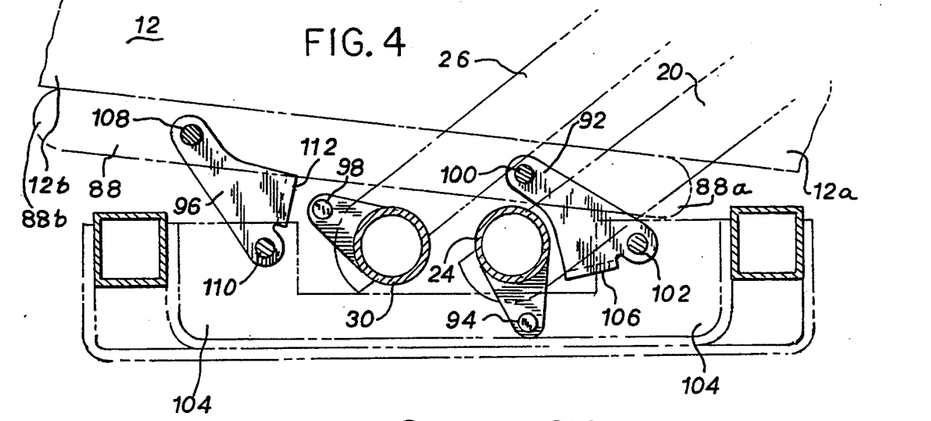
FIG. 4 is a side view of the bottom cushion adjustment means in its initial position, the inertial locking mechanism having been removed.

FIG. 4 depicts the position of the adjustment means when seat back 10 is in the first position (FIG. 1). In the intermediate position, frame 88 and bottom cushion 12 are tilted so that their respective portions 88b and 12b are further away from floor 18 than their respective portions 88a and 12a.

Figure 6:
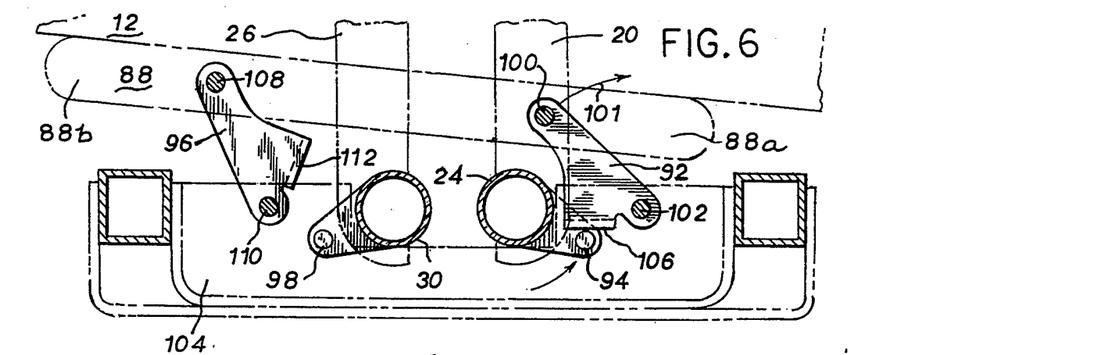
FIG. 6 is a side view of the bottom cushion adjustment means when the seat back is in the intermediate position.

FIG. 6 depicts the positions of the adjustment means and of arms 20 and 26 when the seat back is in the intermediate position, between the first position and the second position. In this position, torsion tube 24 and first dog member 94 have rotated counterclockwise so that dog member 94 engages flange 106 of first pivotable member 92. First portion 100 of first pivotable member 92 moves in an upward direction as indicated by arrow 101. This movement tends to lift end 88a of movable frame 88.

Figure 7:
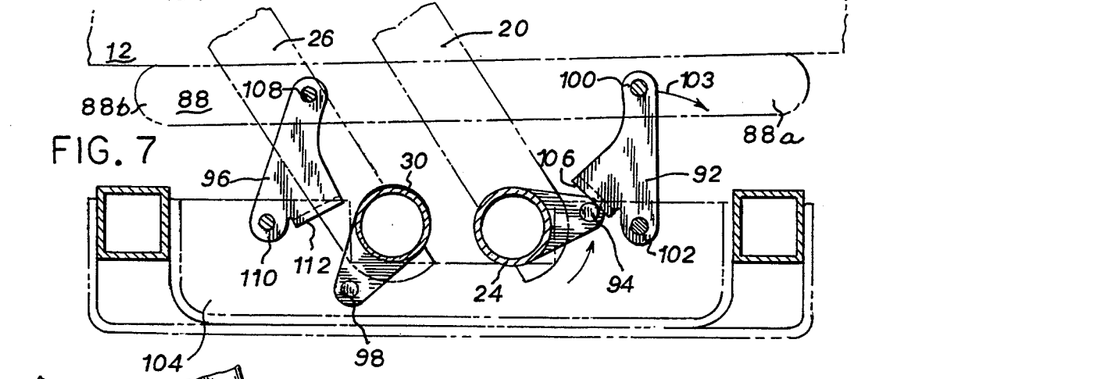
FIG. 7 is a side view of the bottom cushion adjustment means in a position subsequent to the position of FIG. 6.

FIG. 7 depicts the next position in the sequence when arms 20 and 26 have moved towards the second position. Dog member 94 continues to move in the counter-clockwise direction, thereby pushing flange 106 and first pivotable member 92 in an upward direction to lift end 88a of frame 88. First portion 100 now moves in the direction indicated by arrow 103. At the same time, end 88b of frame 88 begins to be lowered towards floor 18 (FIG. 1).

FIG. 9 depicts the final position of the bottom cushion adjustment means, when the seat back and arms 20 and 26 are in the second position. In this position, dog member 94 has disengaged from flange 106, and end 88b of frame 88 is moved in a downward direction towards floor 18 (FIG. 1). First portion 108 of second pivotable member 96 is now located relatively closer to floor 18 when compared to its positions in FIGS. 6 and 7, thereby pulling end 88b down with it towards floor 18. Corresponding end 12b of bottom cushion 12 is also moved towards the floor.

When the seat back is moved from the second position back to the first position with the change of the direction of vehicular travel, dog member 98 rotates in the clockwise direction to engage flange 112, thereby lifting end 88b of frame 88 and tilting frame 88 in a manner very similar to that described above in connection with FIGS. 4, 6 through 7, and 9. Since this reverse operation is essentially identical to the tilting of the bottom cushion from the first position to the second position, a description of the reverse operation will be omitted.

While a preferred embodiment of the present invention has been shown and described, alternate embodiments will be apparent to those skilled in the art and are within the intended scope of the present invention. Therefore, the invention is to be limited only by the following claims.

I claim:

1. A locking mechanism for a vehicle seat, said seat having a frame and a movable seat back, comprising:
   a first, rotatable locking member having a first braking surface, said first locking member being interconnected to and movable with said seat back;
   a second locking member, having a second braking surface, that moves in a direction toward said first braking surface such that said second braking surface engages said first braking surface upon the rapid deceleration of said vehicle; and
   a support means, interconnected with said frame, for supporting said second locking member, said second locking member moving in said direction along said support means upon rapid deceleration of said vehicle to thereby stop the movement of said first locking member and of said seat back.

2. The locking mechanism of claim 1, further comprising:
   a spring that biases said second locking member to a disengaged position when said vehicle is not decelerating.

3. The locking mechanism of claim 1, wherein said support means includes:
   a rod that supports said second locking member.

4. The locking mechanism of claim 1, wherein said first braking surface and said second braking surface have corresponding, substantially curved shapes.

5. The locking mechanism of claim 1, wherein said first locking member imposes load forces on said second locking member when said first braking surface engages said second braking surface, and wherein said locking mechanism further comprises:
   means for absorbing said load forces.

6. The locking mechanism of claim 5, wherein said second locking member has a surface, opposite to said second braking surface, that engages said absorbing means.

7. The locking mechanism of claim 1, further comprising:
   a rotatable torsion tube to which said first locking member is affixed; and
   an arm having one end connected to said seat back and an opposite end connected to said torsion tube.

8. A locking mechanism for a walk-over vehicle seat, said seat having a frame and a movable seat back, comprising:
   a first rotatable member having a first wear surface, said first rotatable member rotating with the movement of said seat back;
   a first locking member having a first braking surface that engages said first wear surface upon rapid deceleration of said vehicle when said vehicle is traveling in a first direction;
   a second rotatable member having a second wear surface, said second rotatable member rotating with the movement of said seat back;
   a second locking member having a second braking surface that engages said second wear surface upon rapid deceleration of said vehicle when said vehicle is traveling in a second direction opposite to said first direction; and
   support means, interconnected with said frame, for supporting said first locking member and said second locking member, said first locking member moving along said support means in said first direction upon rapid deceleration of said vehicle when said vehicle is traveling in said first direction, and said second locking member moving along said support means in said second direction upon rapid deceleration of said vehicle when said vehicle is traveling in said second direction.

9. The locking mechanism of claim 8, further comprising:
   a first rotatable tubular member to which said first rotatable member is affixed;
   a first arm having one end interconnected with said seat back and an opposite end interconnected with said first tubular member;
   a second rotatable member to which said second rotatable member is affixed; and
   a second arm having one end interconnected with said seat back and having an opposite end interconnected with said second tubular member.

10. The locking mechanism of claim 8, wherein said support means further comprises:
    a support rod that supports said first locking member such that said first locking member travels along said rod in said first direction upon rapid deceleration of said vehicle when said vehicle is traveling in said first direction.

11. The locking mechanism of claim 10, wherein said second locking member is supported by said support rod such that said second locking member travels along said rod in said second direction upon rapid deceleration of said vehicle when said vehicle is traveling in said second direction.

12. The locking mechanism of claim 8, further comprising:

spring means for opposing the movement of said first locking member and of said second locking member.

13. The locking mechanism of claim 12, wherein said spring means includes:
    a first spring that opposes the movement of said first locking member; and
    a second spring that opposes the movement of said second locking member.

14. The locking mechanism of claim 8, wherein said first rotatable member imposes load forces on said first locking member when said first wear surface engages said first braking surface, and wherein said locking mechanism further comprises:
    means for absorbing said load forces.

15. The locking mechanism of claim 14, wherein said absorbing means includes a plurality of Belleville washers.

16. A locking mechanism for a vehicle seat, said seat having a movable seat back, comprising:
    a first, rotatable locking member having a first braking surface, said first locking member being interconnected to and movable with said seat back;
    a second locking member, having a second braking surface, that moves in a direction toward said first braking surface to engage said first braking surface upon the deceleration of said vehicle, thereby stopping the movement of said first locking member and of said seat back;
    a rod that supports said second locking member; and
    a spring, disposed on said rod, that biases said second locking member to a disengaged position when said vehicle is not decelerating.

17. A locking mechanism for a vehicle seat, said seat having a movable seat back, comprising:
    a first, rotatable locking member having a first braking surface, said first locking member being interconnected to and movable with said seat back;
    a second locking member, having a second braking surface, that moves in a direction toward said first braking surface to engage said first braking surface upon the deceleration of said vehicle, thereby stopping the movement of said first locking member and of said seat back; and
    means, including a plurality of Belleville washers, for absorbing load forces imposed by said first locking member on said second locking member when said first braking surface engages said second braking surface.

18. A locking mechanism for a walk-over vehicle seat, said seat having a movable seat back and a bottom seat portion, comprising:
    a first rotatable member having a first wear surface, said first rotatable member rotating with the movement of said seat back;
    a first locking member having a first braking surface that engages said first wear surface upon deceleration of said vehicle when said vehicle is traveling in a first direction;
    a second rotatable member having a second wear surface, said second rotatable member rotating with the movement of said seat back;
    a second locking member having a second braking surface that engages said second wear surface upon deceleration of said vehicle when said vehicle is traveling in a second direction opposite to said first direction;
    an adjustment means for adjusting the position of said bottom seat portion when said seat back is moved from facing said first direction to facing said second direction, or when said seat back is moved from facing said second direction to facing said first direction, said adjustment means comprising:
    a movable frame means for supporting said bottom seat portion;
    at least one stationary member;
    a first pivotable member having one portion pivotally connected to said movable frame means and a second portion pivotally connected to said at least one stationary member;
    a first dog member that moves with the rotation of said first rotatable member and that engages said first pivotable member to adjust said movable frame means and said bottom seat portion when said seat back is moved from facing said first direction to facing said second direction;
    a second pivotable member having one portion pivotally connected to said movable frame means and a second portion pivotally connected to said at least one stationary member; and
    a second dog member that moves with the rotation of said second rotatable member and that engages said second pivotable member to adjust said movable frame means and said bottom seat portion when said seat back is moved from facing said second direction to facing said first direction.

* * * * *

UNITED STATES PATENT AND TRADEMARK OFFICE
CERTIFICATE OF CORRECTION

PATENT NO. : 5,362,124
DATED : November 8, 1994
INVENTOR(S) : Richard S. Schlidt It is certified that error appears in the above-indentified patent and that said Letters Patent is hereby corrected as shown below:

On the title page, item [56] References Cited, under
    OTHER PUBLICATIONS: In the publication "Saf-T Walkover" brochure, after published by, delete "Aircraft" and substitute therefor --Artcraft--.

Signed and Sealed this

Third Day of January, 1995

Attest:

BRUCE LEHMAN

*Attesting Officer*      *Commissioner of Patents and Trademarks*